United States Patent
Tsuji et al.

[11] Patent Number: 5,911,513
[45] Date of Patent: Jun. 15, 1999

[54] SLIDING BEARING OF COPPER-BASED ALLOY

[75] Inventors: Hideo Tsuji; Hideo Ishikawa; Yasuo Ido; Takayuki Shibayama, all of Nagoya, Japan

[73] Assignee: Daido Metal Company Ltd., Nagoya, Japan

[21] Appl. No.: 08/985,067

[22] Filed: Dec. 4, 1997

[30] Foreign Application Priority Data

Jan. 22, 1997 [JP] Japan .................................. 9-024265

[51] Int. Cl.$^6$ ...................................................... F16C 33/06
[52] U.S. Cl. ............................................ 384/276; 384/912
[58] Field of Search .................................. 384/276, 294, 384/912, 913

[56] References Cited

U.S. PATENT DOCUMENTS

| | | | |
|---|---|---|---|
| 3,249,391 | 5/1966 | De Hart et al. ........................ | 384/294 |
| 3,361,502 | 1/1968 | Wienkamer et al. ................... | 384/294 |
| 4,553,856 | 11/1985 | Bierlein et al. ......................... | 384/276 |
| 4,830,933 | 5/1989 | Hodes et al. ........................ | 384/912 X |
| 5,209,578 | 5/1993 | Eastham et al. ........................ | 384/276 |
| 5,466,538 | 11/1995 | Tanaka et al. ...................... | 384/912 X |

FOREIGN PATENT DOCUMENTS

| | | |
|---|---|---|
| 7-190064 | 7/1995 | Japan . |
| 0706672 | 3/1954 | United Kingdom . |

*Primary Examiner*—Thomas R. Hannon
*Attorney, Agent, or Firm*—Browdy and Neimark

[57] ABSTRACT

A sliding bearing of copper-based alloy is provided which is superior in seizure resistance and wear resistance.

The sliding bearing of copper-based alloy is provided with a back metal layer, a bearing alloy layer disposed on the back metal layer which bearing alloy layer consists of a copper alloy, a copper-zinc intermediate layer containing 20 to 50 wt % of zinc disposed on the bearing alloy layer, and a tin-based or aluminum-based overlay disposed on the intermediate layer.

8 Claims, 1 Drawing Sheet

SLIDING BEARING OF COPPER-BASED ALLOY

BACKGROUND OF THE INVENTION

1. Field of the Invention

This invention relates to sliding bearings of copper-based alloy. More particularly, the invention relates to a sliding bearing of copper-based alloy comprising a bearing alloy layer made of a copper alloy and a tin- or indium-containing overlay provided above the bearing alloy layer.

2. Description of the Related Art

There is known a sliding bearing of copper-based alloy which comprises a back metal layer, a bearing alloy layer made of a copper-based alloy and an overlay bonded onto the bearing alloy layer. The reason for disposing the overlay on the bearing alloy layer is that it enhances both the conformability and foreign matter embeddability of the bearing, which overlay is known to be made of a Pb-based alloy containing Sn and/or In or a Sn-based alloy.

In such sliding bearing of copper-base alloy, in the case where the overlay containing Sn and/or In is in direct contact with the bearing alloy layer, a brittle Cu—Sn compound layer occurs at a boundary defined between the overlay and the bearing alloy layer, which compound layer causes deteriorated fatigue resistance.

As a consequence, in the sliding bearing of copper-based alloy provided with the Sn-containing overlay, an intermediate layer of Ni or Ag is interposed between the overlay and the bearing alloy layer so as to prevent the brittle Cu—Sn compound layer from occurring.

With regard to the sliding bearing of copper-based alloy in which an intermediate Ni layer is laid, when the intermediate layer is exposed due to the wearing-out of the overlay, the corresponding shaft comes in direct contact with the intermediate layer hard in hardness, which is apt to cause seizure. In order to avoid the seizure, the intermediate layer has been formed to have a small thickness of 2 to 3 microns so that, even when it is exposed partially, such layer gets worn away and lost sooner so as to make the underlying layer or bearing alloy layer be exposed. In this way, improved seizure resistance has been attained by preventing the intermediate layer from being exposed at a time over a wide region of the surface of the bearing.

Another kind of bearing is known in which a multiplicity of grooves of several microns in depth are juxtaposed circumferentially of the bearing. This known construction is so designed that even upon wearing-down of an overlay, an intermediate layer cannot be exposed at a time over a large extent.

In Japanese Unexamined Patent Publication No. 7-190064 by the same assignee as in the present invention, still another bearing is disclosed which has an intermediate copper-zinc layer disposed between a bearing alloy layer and a lead-based overlay containing Sn and/or In. In the prior invention, Sn or In in the overlay is prevented from diffusing into the bearing alloy layer, consequently preventing a brittle Cu—Sn compound layer from occurring and hence improving seizure resistance through the action of the soft intermediate copper-zinc layer.

However, in the case of the provision of the grooves of several microns in depth or of making the Ni intermediate layer thin, it is difficult to further improve the seizure resistance. In addition, recently, a Pb-free or Pb content-reduced bearing has been desired in view of environmental influence of the disposal thereof after use.

SUMMARY OF THE INVENTION

Accordingly, the present invention provides a sliding bearing of copper-based alloy which has both excellent seizure resistance and excellent fatigue resistance and which is environmentally preferable because of non-use of lead. In such sliding bearing, an intermediate layer 3 is formed of a copper-zinc alloy without reliance on Ni plating with the result that a brittle Cu—Sn compound layer is prevented from occurring between a bearing alloy layer 2 and an overlay 4.

According to the first aspect of the invention, there is provided a sliding bearing of copper-based alloy, comprising a back metal layer 1, a bearing alloy layer 2 provided on the back metal layer which bearing alloy layer consists of a copper alloy, an intermediate layer 3 provided on the bearing alloy layer which intermediate layer consists of a copper-zinc alloy containing 20 to 50 wt % zinc, and a tin-based overlay 4 provided on the intermediate layer.

According to the second aspect of the invention, there is provided a sliding bearing of copper-based alloy, comprising a back metal layer 1, a bearing alloy layer 2 provided on the back metal layer which bearing alloy layer consists of a copper alloy, an intermediate layer 3 provided on the bearing alloy layer which intermediate layer consists of a copper-zinc alloy containing 20 to 50 wt % zinc, and an aluminum-based overlay 4 provided on the intermediate layer which aluminum-based overlay contains 5 to 55 wt % tin.

In the sliding bearing of copper-based alloy provided in accordance with the present invention, enhanced fatigue resistance can be achieved because a brittle Cu—Sn compound layer is prevented from occurring. Besides and advantageously, improved seizure resistance is obtained on the ground that even when an overlay gets worn away, the soft intermediate layer of a Cu—Zn alloy is exposed.

The bearing alloy layer 2 used in the invention may be formed of copper-containing alloys, particularly a copper-lead alloy containing Pb, a copper-tin alloy containing Sn and so on.

The intermediate layer 3 of a copper-zinc alloy used in the invention may contain 20 to 50 wt % of zinc and the balance copper. Smaller contents of zinc than 20 wt % are less effective in preventing a Cu—Sn compound from occurring at a boundary defined between the overlay and the bearing alloy layer. On the other hand, larger contents of zinc than 50 wt % lead to deteriorated sliding property after the overlay is worn away, and causes deteriorated fatigue resistance. Thus, the intermediate layer is formed of a copper-zinc alloy containing 20 to 50 wt % of zinc. Particularly, the preferable content of zinc is 25 to 35 wt %.

The thickness of the intermediate layer 3 may preferably ranges 0.5 to 10.0 μm. In a case of a thickness less than 0.5 μm, it becomes impossible to sufficiently prevent a Cu—Sn compound from occurring. In another case of a thickness exceeding 10 μm, the intermediate layer becomes brittle and fatigue resistance is deteriorated.

The overlay 4 used in the invention may contain 0.1 to 25 wt % in total of at least one additive selected from the group consisting of In, Zn, Cu, Sb and Ag in order to improve wear resistance. In a case of the additive less than 0.1 wt % it is impossible to obtain the advantage of the addition, while in another case of the additive more than 25 wt % the melting point of the overlay is lowered with the result that wear resistance at elevated temperature is deteriorated.

In the Al-based overlay 4, 5 to 55 wt % Sn is added to improve foreign matter embeddability and wear resistance.

More than 55 wt % of Sn causes a deterioration of fatigue resistance. Further improvement in wear resistance can be achieved by adding a total amount of 0.1 to 3 wt % of at least one selected from In, Zn, Cu and Ag, and larger total amount than 3 wt % causes the lowered melting of the overlay with the result that the wear resistance is deteriorated.

The intermediate Cu—Zn layer 3 can be formed by a conventional process such as electroplating of a wet type or PVD of a dry type or any other methods. For instance, the intermediate layer may be formed by directly plating the Cu—Zn alloy on the bearing alloy layer, or by a method comprising the steps of plating on the bearing alloy layer with a Zn-based alloy such as a Zn—Sn alloy or the like, forming the overlay, and subjecting the resultant layers to a heat treatment at 130° C. for about 4 hours so that the intermediate Cu—Zn layer may be formed by the diffusion of Cu contained in the bearing alloy layer and Zn contained in the plating layer.

As described hereinabove, the sliding bearing of copper-based alloy according to the first or second aspect of the invention is excellent in both fatigue resistance and seizure resistance.

DESCRIPTION OF PREFERRED EMBODIMENTS

Figure 1:
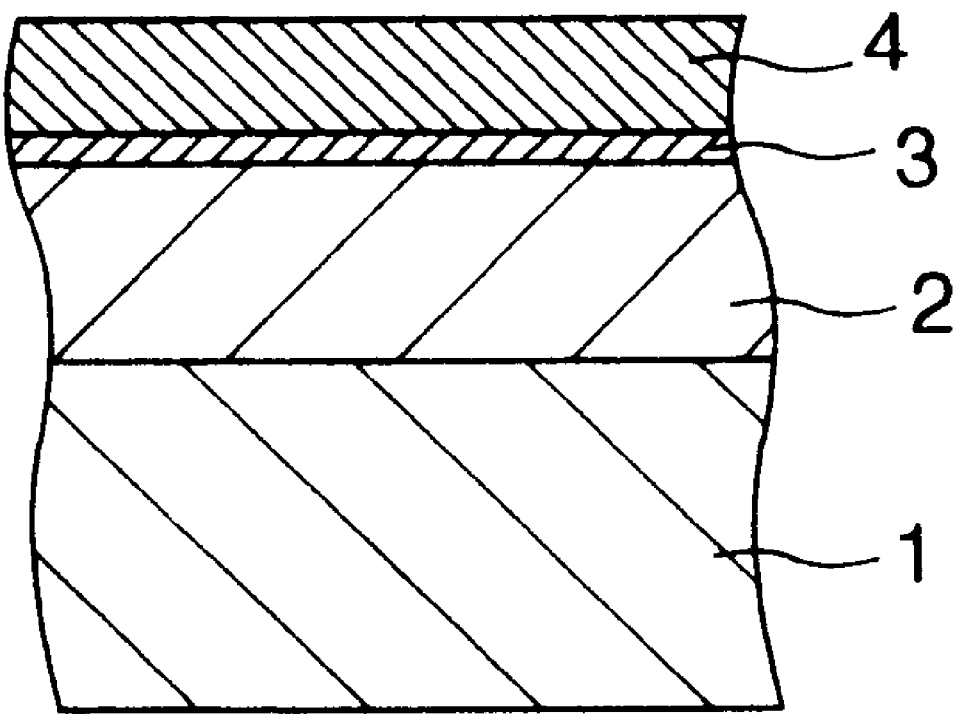
FIG. 1 is a partially cross-sectional view of a sliding bearing of copper-based alloy embodying the invention.

The specific examples of the invention are described below together with comparative examples.

On to a steel sheet (SPES) plated with copper having a thickness of 8 μm was spreaded a powder of a bearing alloy (23 wt % of Pb, 3.5 wt % of Sn and Cu as the balance), which was then sintered at a temperature of 700 to 900° C. for 10 to 30 minutes in a furnace of a reducing atmosphere. The resultant composite sintered material was thereafter passed between rolls. The sintering and rolling were repeated twice to obtain a bimetal, which bimetal thus obtained had a total sheet thickness of 1.6 mm and a bearing alloy layer having thickness of 0.35 mm. The bimetal was subjected to cutting and machining to thereby obtain a half sliding bearing specimen, from which there were prepared test pieces. The test pieces were subjected to the pretreatments of degreasing, electrolytic degreasing, and pickling in this sequence. Then, an intermediate layer and an overlay of 20 μm in thickness were formed on the test pieces by plating, as shown in Table 1.

The intermediate layer 3 was formed by a process comprising the steps of plating a Zn—Sn alloy on a bearing alloy layer, forming an overlay thereon and subjecting them to a heat treatment at 130° C. for approximately 4 hours, whereby a Cu—Zn intermediate layer was formed by the diffusion of both Cu contained in the bearing alloy layer and Zn contained in the plating.

The overlay was formed by a PVD method (physical vapor deposition method) regarding Example 10 and Comparative Example 6 and by electroplating of a wet type regarding other Examples and Comparative Examples.

The composition and thickness of each of the intermediate layer and the overlay were confirmed from the cross-sectional structure thereof inspected by means of EPMA.

In regard to the bearings, fatigue resistance test was performed by use of Soda's fatigue resistance testing machine under the conditions shown in Table 2, so that the maximum specific load with no fatigue was measured. The results are showed in Table 1.

TABLE 1

| Example No. | | Intermediate Layer | | | Overlay Composition (wt %) | | | | | | | Fatigue Test Maximum Specific Load with no Fatigue (MPa) |
|---|---|---|---|---|---|---|---|---|---|---|---|---|
| | | Composition (wt %) | | Thickness | Sn | Sb | Cu | Ag | In | Zn | Al | |
| | | Cu | Zn | (μm) | | | | | | | | |
| Examples of the Invention | 1 | the balance | 25 | 2 | the balance | 7 | — | — | — | — | — | 40 |
| | 2 | the balance | 30 | 5 | the balance | 7 | — | — | — | — | — | 40 |
| | 3 | the balance | 40 | 5 | the balance | 7 | — | — | — | — | — | 40 |
| | 4 | the balance | 35 | 2 | the balance | — | 2 | — | — | — | — | 40 |
| | 5 | the balance | 30 | 7 | the balance | — | 2 | — | — | 2 | — | 40 |
| | 6 | the balance | 30 | 5 | the balance | — | — | 2 | — | — | — | 40 |
| | 7 | the balance | 40 | 5 | the balance | — | — | 2 | 5 | — | — | 40 |
| | 8 | the balance | 25 | 7 | the balance | 6 | 2 | — | — | — | — | 40 |
| | 9 | the balance | 40 | 5 | the balance | 6 | 2 | — | — | — | — | 40 |
| | 10 | the balance | 30 | 2 | 40 | — | — | — | — | — | the balance | 45 |
| | 11 | the balance | 25 | 5 | 10 | — | 1 | — | — | — | the balance | 45 |
| Comparative Examples | 1 | — | — | — | the balance | 7 | — | — | — | — | — | 20 Peeling off of the overlay |
| | 2 | — | — | — | the balance | — | 2 | 2 | — | — | — | 20 Peeling off of the overlay |
| | 3 | the balance | 5 | 2 | the balance | 7 | — | — | — | — | — | 20 |
| | 4 | the balance | 70 | 10 | the balance | 7 | — | — | — | — | — | 25 |
| | 5 | the balance | 25 | 15 | the balance | — | 2 | 2 | — | — | — | 25 |
| | 6 | the balance | 30 | 15 | 70 | — | — | — | — | — | the balance | 25 |

TABLE 2

| Fatigue Testing Machine | |
| --- | --- |
| Dimensions of Bearing | Inner Dia. 56 mm × Length 17 mm |
| Time | 20 hours |
| Number of Rotation | 4,000 rpm |
| Lubricating Oil | SAE20 |
| Lubricating Oil Temperature (Entrance) | 60° C. |
| Material of Shaft | S55C |

According to the results of the fatigue resistance shown in Table 1, in each of Comparative Example Nos. 1 and 2 in which no intermediate layers had been provided, the overlay was peeled off, which was deemed to be caused due to the facts that Sn contained in the overlay was diffused to form a brittle copper-tin compound at a boundary defined between the bearing alloy layer and the overlay and that the compound deteriorated bonding strength between the overlay and the bearing alloy layer.

In Comparative Example No. 3 in which Zn had been contained at such a low level as 5 wt %, such a low maximum specific load with no fatigue as 20 MPa was caused, which was deemed to be attributed to the respect that it was impossible to sufficiently prevent Sn in the overlay from diffusing. On the other hand, Comparative Example No. 4 containing Zn as high amount as 70 wt % caused deterioration of fatigue resistance, which was deemed to be attributed to the fact that, when the overlay worn away, the intermediate layer was exposed and the sliding characteristics thereof became inferior with the result that fatigue resistance was deteriorated.

On the other hand, it was found that, in each of Example Nos. 1 to 10, Sn and In were sufficiently prevented from diffusing by the intermediate layer 3, so that high levels of maximum specific load with no fatigue were obtained.

What is claimed is:

1. A sliding bearing of copper-based alloy, comprising a back metal layer, a bearing alloy layer provided on the back metal layer which bearing alloy layer consists of a copper alloy, an intermediate layer provided on the bearing alloy layer which intermediate layer consists of a copper—zinc alloy containing 20 to 50 wt % zinc, and a tin-based overlay provided on the intermediate layer.

2. A sliding bearing of copper-based alloy according to claim 1, said tin-based overlay consisting essentially of: at least one of 0.1 to 25 wt % in total selected from the group consisting of indium, copper, zinc, antimony and silver; and the balance tin and incidental impurities.

3. A sliding bearing of copper-based alloy according to claim 2, said intermediate layer of copper—zinc alloy being formed by a plating method.

4. A sliding bearing of copper-based alloy according to claim 1, said intermediate layer of copper—zinc alloy being formed by a plating method.

5. A sliding bearing of copper-based alloy, comprising a back metal layer, a bearing alloy layer provided on the back metal layer which bearing alloy layer consists of a copper alloy, an intermediate layer provided on the bearing alloy layer which intermediate layer consists of a copper—zinc alloy containing 20 to 50 wt % zinc, and an aluminum-based overlay provided on the intermediate layer which aluminum-based overlay contains 5 to 55 wt % tin.

6. A sliding bearing of copper-based alloy according to claim 3, said aluminum-based overlay containing at least one of 0.1 to 3 wt % in total selected from the group consisting of indium, zinc, copper, and silver.

7. A sliding bearing of copper-based alloy according to claim 6, said intermediate layer of copper—zinc alloy being formed by a plating method.

8. A sliding bearing of copper-based alloy according to claim 5, said intermediate layer of copper—zinc alloy being formed by a plating method.

* * * * *